(12) United States Patent
Fuhr et al.

(10) Patent No.: US 12,381,292 B2
(45) Date of Patent: Aug. 5, 2025

(54) PRISMATIC LITHIUM ION CELL WITH POSITIVE POLARITY RIGID CONTAINER

(71) Applicant: CPS Technology Holdings LLC, New York, NY (US)

(72) Inventors: Jason Daniel Fuhr, Sussex, WI (US); Jonathan Paul Lobert, Hartford, WI (US); Xugang Zhang, Erie, PA (US)

(73) Assignee: CPS Technology Holdings LLC, New York, NY (US)

( * ) Notice: Subject to any disclaimer, the term of this patent is extended or adjusted under 35 U.S.C. 154(b) by 429 days.

(21) Appl. No.: 17/825,459

(22) Filed: May 26, 2022

(65) Prior Publication Data

US 2022/0285799 A1    Sep. 8, 2022

Related U.S. Application Data

(63) Continuation of application No. 13/659,079, filed on Oct. 24, 2012, now Pat. No. 11,374,293.

(Continued)

(51) Int. Cl.
  *H01M 50/545*    (2021.01)
  *H01M 50/10*    (2021.01)
  (Continued)

(52) U.S. Cl.
  CPC ....... *H01M 50/545* (2021.01); *H01M 50/103* (2021.01); *H01M 50/119* (2021.01);
  (Continued)

(58) Field of Classification Search
  CPC .. H01M 50/103; H01M 50/119; H01M 50/15; H01M 50/159; H01M 50/3425;
  (Continued)

(56) References Cited

U.S. PATENT DOCUMENTS 6,159,631 A    12/2000  Thompson et al.
7,601,460 B2   10/2009  Hashimoto et al.
(Continued)

FOREIGN PATENT DOCUMENTS

CN    1283879 A    2/2001
CN    1753228 A    3/2006
(Continued)

OTHER PUBLICATIONS

Huasheng Gong et al.; Battery Maintenance Guide; National Defence Industry Press; Jun. 30, 2011; p. 156, consisting of 7-pages.
(Continued)

*Primary Examiner* — Brian R Ohara
*Assistant Examiner* — Brent C Thomas
(74) *Attorney, Agent, or Firm* — Weisberg I.P. Law, P.A.

(57) ABSTRACT

Systems and methods are disclosed for battery cells with positive polarity rigid containers. In accordance with disclosed embodiments, the cell may include a container and a lid piece that couple together to form a rectangular prismatic geometry. An electrode assembly having positive and negative coils may be disposed within the cell, and the positive coil may be conductively coupled to the cell. In this way, the cell (e.g., both the lid and the container) may be positively polarized. Further, the electrode assembly may incorporate a jelly-roll or a stacked structure. In one embodiment, the lid piece may include a vent that opens in response to pressure in the cell surpassing an established threshold. The lid may further include a positive terminal, negative terminal, and a method for filling the cell with electrolyte. Another embodiment may provide a battery module include multiple cells with positive polarity rigid containers.

18 Claims, 9 Drawing Sheets

Related U.S. Application Data

(60) Provisional application No. 61/555,298, filed on Nov. 3, 2011.

(51) Int. Cl.
*H01M 50/103* (2021.01)
*H01M 50/119* (2021.01)
*H01M 50/159* (2021.01)
*H01M 50/502* (2021.01)
*H01M 50/531* (2021.01)
*H01M 50/534* (2021.01)
*H01M 50/536* (2021.01)
*H01M 50/543* (2021.01)
*H01M 50/55* (2021.01)
*H01M 50/553* (2021.01)
*H01M 10/052* (2010.01)
*H01M 50/15* (2021.01)
*H01M 50/342* (2021.01)

(52) U.S. Cl.
CPC ....... *H01M 50/159* (2021.01); *H01M 50/502* (2021.01); *H01M 50/534* (2021.01); *H01M 50/536* (2021.01); *H01M 50/55* (2021.01); *H01M 50/553* (2021.01); *H01M 10/052* (2013.01); *H01M 50/15* (2021.01); *H01M 50/3425* (2021.01)

(58) Field of Classification Search
CPC ............. H01M 50/502; H01M 50/534; H01M 50/536; H01M 50/545; H01M 50/55; H01M 50/553
See application file for complete search history.

(56) References Cited

U.S. PATENT DOCUMENTS

| | | | |
|---|---|---|---|
| 2002/0028374 A1* | 3/2002 | Yoshida | H01M 10/0431 429/94 |
| 2003/0186113 A1 | 10/2003 | Hashimoto et al. | |
| 2004/0191612 A1 | 9/2004 | Akita et al. | |
| 2008/0026288 A1 | 1/2008 | Marple et al. | |
| 2008/0102356 A1* | 5/2008 | Choi | H01M 50/166 429/122 |
| 2009/0130548 A1* | 5/2009 | Lee | H01M 10/0431 429/161 |
| 2010/0081048 A1 | 4/2010 | Nansaka et al. | |
| 2010/0143786 A1 | 6/2010 | Kim | |
| 2010/0323235 A1* | 12/2010 | Takami | H01M 50/512 429/178 |
| 2011/0159353 A1* | 6/2011 | Byun | H01M 50/528 429/160 |
| 2011/0262779 A1* | 10/2011 | Maleki | H01M 10/0431 429/10 |
| 2012/0231305 A1 | 8/2012 | Guen | |

FOREIGN PATENT DOCUMENTS

| | | |
|---|---|---|
| CN | 1776952 A | 5/2006 |
| CN | 1830114 A | 9/2006 |
| CN | 102044639 A | 5/2011 |
| CN | 102088106 A | 6/2011 |
| CN | 102197509 A | 9/2011 |
| JP | 2002231299 A | 8/2002 |
| WO | 2010085636 A2 | 7/2010 |

OTHER PUBLICATIONS

Kun Yu et al.; Teaching Materials for Vocational Qualification Appraisal in Lithium-Ion Battery Manufacturing; Red Flag Publishing House; Feb. 28, 2005, p. 9, consisting of 4-pages.

Chinese Third Office Action and Rejection Decision with English language Machine Translation dated Jul. 25, 2022; for issued for Chinese patent application No. 201910216731.2; Document No. 2022072002525220; consisting of 55 pages.

* cited by examiner

PRISMATIC LITHIUM ION CELL WITH POSITIVE POLARITY RIGID CONTAINER

CROSS REFERENCE TO RELATED APPLICATIONS

This application is a continuation of U.S. patent application Ser. No. 13/659,079, filed on Oct. 24, 2012, entitled PRISMATIC LITHIUM ION CELL WITH POSITIVE POLARITY RIGID CONTAINER, which claims priority from and the benefit of U.S. Provisional Application Ser. No. 61/555,298, entitled, "Prismatic Lithium Ion Cell with Positive Polarity Rigid Container," filed Nov. 3, 2011, the entireties of both of which are hereby incorporated by reference in their entireties for all purposes.

FIELD OF THE DISCLOSURE

The present disclosure relates generally to the field of batteries and battery modules. More specifically, the present disclosure relates to battery cells with positive polarity rigid containers that may be used particularly in vehicular contexts, as well as other energy storage/expending applications.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles using electric power for all or a portion of their motive power may provide numerous advantages as compared to traditional vehicles powered by the reaction of gasoline within internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles. For example, it is desirable to increase the distance that such vehicles may travel without needing to recharge the batteries. It is also desirable to improve the performance and durability of the batteries, while reducing the cost associated with the battery modules.

The technologically advanced use of battery modules and the desire to enhance performance of electric vehicles have given rise to new design and engineering challenges. For example, increased energy density may be desirable for such battery modules to increase vehicle travel distance per battery charge cycle. Currently, electric vehicles deriving the entirety of their motive force from electric power can only travel approximately 40-100 miles per charge. This short travel distance may prevent widespread public acceptance of such electric vehicles. Accordingly, it would be desirable to provide an improved battery module that exhibits improved energy density and durability while decreasing production costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present systems may be adapted to a wide range of settings and may be particularly well suited to vehicles deriving at least a portion of their motive force from electric power. Moreover, the systems may be useful in other applications, such as power storage for alternative energy sources, portable battery modules, and back-up power supplies.

Embodiments of the present disclosure relate to battery cells with positive polarity rigid containers. In accordance with disclosed embodiments, the cell may include a container and a lid piece that couple together to form a rectangular prismatic geometry. An electrode assembly having positive and negative coils may be disposed within the cell, and the positive coil may be conductively coupled to the cell. In this way, the cell (e.g., both the lid and the container) may be positively polarized. Further, the electrode assembly may incorporate a jelly-roll or a stacked structure. In one embodiment, the lid piece may include a vent that opens in response to pressure in the cell surpassing an established threshold. The lid may further include a positive terminal, negative terminal, and a method for filling the cell with electrolyte.

In another embodiment, a battery module may include multiple battery cells having the positive polarity rigid containers. Within the module, each cell may include a positive and a negative terminal arranged generally near one another. The positive polarization of the cells may enable each of the cells in the module to be arranged in the same orientation with respect to terminal placement. The module may incorporate intercellular connections, which operatively connect the cells to one another. In one embodiment, the intercellular connections may be shortened due to terminal placement and may be formed by stamping to reduce waste associated with manufacturing.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

DRAWINGS

Various aspects of this disclosure may be better understood upon reading the following detailed description and upon reference to the drawings in which.

DETAILED DESCRIPTION

Figure 1:
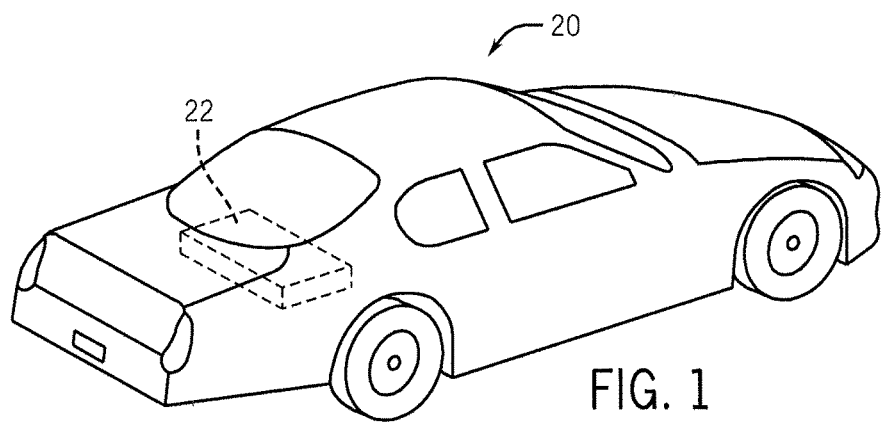
FIG. 1 is a perspective view of an embodiment of a vehicle having a battery module contributing all or a portion of the motive power for the vehicle.

The term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses one or more motors powered by electric energy for its propulsion.

As described in more detail below, disclosed herein are embodiments of prismatic lithium-ion cells with positive polarity rigid containers, which may be well suited to xEV applications. Embodiments of the prismatic cells provided herein may include a positively polarized container, which may be achieved through the coupling of the positive electrode coil to the container of the cell. Accordingly, the positive terminal may be located anywhere on the outer container of the cell, which enables a variety of improved configurations for battery modules. Additionally, the container may be sufficiently rigid, such that the inner elements of the cell may be protected. The cell may generally include a container (e.g., can) and lid piece that house a wound or stacked electrode, positive and negative current collectors, a positive terminal, and electrical insulation. The lid piece may contain positive and/or negative terminals, an integral vent, and a sealing device, such as a rivet. The positive polarity containers with prismatic geometry may provide several advantages when packaged as a battery module.

The battery modules that include the prismatic lithium-ion cells with positive polarity rigid containers may be easily configured for use in xEVs. In certain embodiments, the xEV may include at least one battery module, and each battery module may include at least one prismatic lithium-ion cell configured to store and dispense electrical charge. The prismatic lithium-ion cell may have a positive polarity rigid container, which may offer advantages over traditional battery pack systems. For example, the prismatic cell may be arranged and constructed in such a way that improves the system level packaging efficiency, resulting in a higher energy density than lithium-ion cells of traditional systems. Further, the positive polarity containers may facilitate various packaging configurations of cells, resulting in improved battery modules to be used in xEVs and a variety of other applications.

Turning now to the drawings, FIG. 1 is a perspective view of a vehicle 20 in the form of an automobile (e.g., a car) having a battery module 22 for contributing all or a portion of the motive power for the vehicle 20. The battery module 22 may be constructed from multiple individual prismatic cells. Although illustrated as a car in FIG. 1, the type of the vehicle 20 may be implementation-specific, and, accordingly, may differ in other embodiments, all of which are intended to fall within the scope of the present disclosure. For example, the vehicle 20 may be a truck, bus, industrial vehicle, motorcycle, recreational vehicle, boat, or any other type of vehicle that may benefit from the use of electric power for all or a portion of its propulsion power. For the purposes of the present disclosure, it should be noted that the battery modules and systems illustrated and described herein are particularly directed to providing and/or storing energy in xEVs, as was described in detail above. However, embodiments of the lithium-ion cells having positive polarity rigid containers may be utilized in other, non-vehicular applications as well.

Further, although the battery module 22 is illustrated in FIG. 1 as being positioned in the trunk or rear of the vehicle 20, according to other embodiments, the location of the battery module 22 may differ. For example, the position of the battery module 22 may be selected based on the available space within the vehicle 20, the desired weight balance of the vehicle 20, the location of other components used with the battery module 22 (e.g., battery management modules, vents or cooling devices, etc.), and a variety of other implementation-specific considerations.

Figure 2:
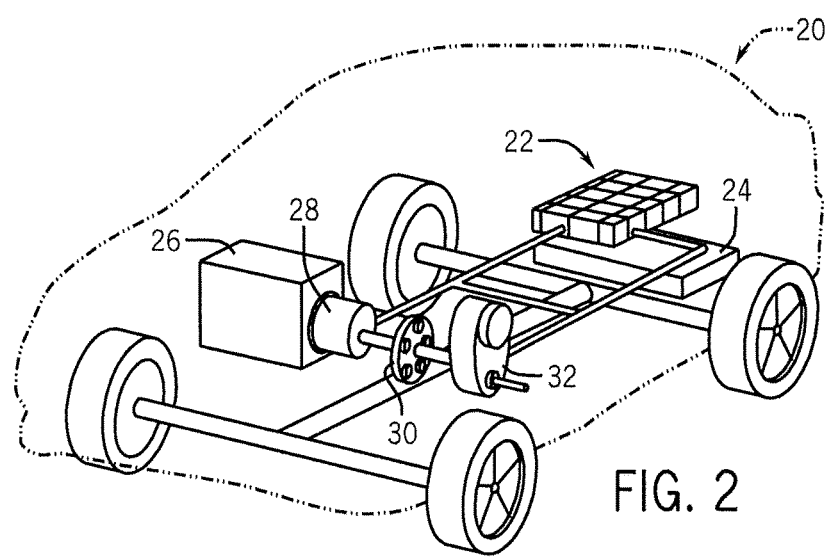
FIG. 2 illustrates a cutaway schematic view of an embodiment of the vehicle of FIG. 1 provided in the form of a hybrid electric vehicle.

For purposes of discussion, it may be helpful to discuss the battery module 22 with respect to a particular type of xEV, for example, an HEV. FIG. 2 illustrates a cutaway schematic of the vehicle 20 provided in the form of an HEV. In the illustrated embodiment, the battery module 22 is provided toward the rear of the vehicle 20 proximate a fuel tank 24. The fuel tank 24 supplies fuel to an internal combustion engine 26, which is provided for the instances when the HEV utilizes gasoline power to propel the vehicle 20. An electric motor 28, a power split device 30, and a generator 32 are also provided as part of the vehicle drive system. Such an HEV may be powered or driven by only the battery module 22, by only the engine 26, or by both the battery module 22 and the engine 26.

Figure 3:
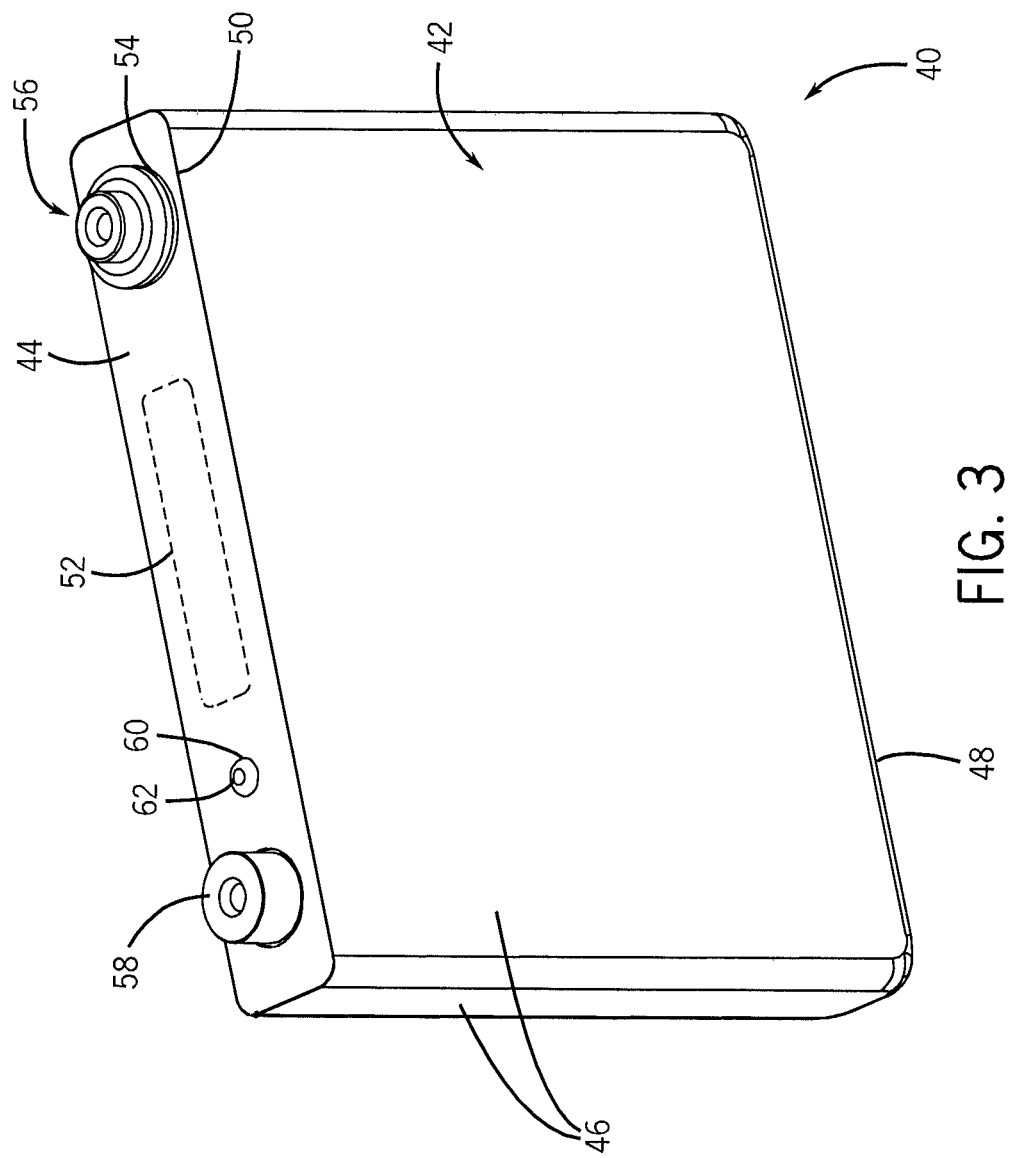
FIG. 3 is a perspective view of an embodiment of a prismatic cell with a positive polarity rigid container.

As previously noted, each battery module 22 is constructed from multiple individual cells (e.g., lithium ion). An embodiment of a single prismatic cell 40 is illustrated in FIG. 3. The rectangular prismatic cell 40 is generally composed of a container portion 42 and a lid piece 44. As detailed below, both the container 42 and the lid piece 44 have features that enable the prismatic cell 40 to offer advantages for use in xEV applications, such as structural rigidity and positive polarization.

The prismatic cell 40 assembly, including the container 42 and the lid 44, is structurally rigid. To provide rigidity, the cell 40 may be formed from metallic materials, such as, aluminum or steel. For example, the rigidity of the cell 40 may enable the cell 40 to pass standard packaging industry tests, such as drop (ISO 2248), impact (ISO 2244), stacking (ISO 2234), and/or compression (ISO 12048) tests. The rigidity of the cell 40 may enable multiple cells 40 to be tightly packed within the battery module 22 to reduce the overall volume occupied by the battery module 22. Further, the rigidity of the prismatic cell 40 may improve the durability of the cell 40 by preventing punctures and other minor deformations of the cell 40, thereby improving the abuse tolerance of the cell 40.

The container 42 includes vertical sides 46 (e.g., front, back, left, and right) and a bottom 48 of the cell 40. The geometry of the container 42 is such that opposite vertical sides 46 (e.g., front and back/right and left) are generally parallel. Accordingly, the bottom 48 is generally perpendicular to the vertical sides 46. The top of the container 42 remains open, leaving an opening 50. The opening 50 of the container 42 accepts the lid piece 44, which may be constructed separately from the container 42. The container 42 and the lid piece 44 may be coupled (e.g., crimped, welded, etc.) to form a rectangular prism, resulting in the prismatic shape of the cell 40.

The lid piece 44 may integrally include a vent 52. The integral vent 52 may provide a pressure relief feature, while also simplifying the manufacturing process associated with the lid piece 44. In the event that pressure builds within the cell 40, the vent 52 may act as a release valve and may partially disengage (e.g., remains attached by a tab) from the lid piece 44 to release the pressure. The integral vent 52 may also simplify manufacturing and assembly procedures for constructing the cell 40. For example, the vent 52 may be scored, formed, cut, coined, or otherwise machined into the lid piece 44 at the same time as the lid piece 44 is stamped, thereby requiring only one manufacturing step and reducing associated manufacturing costs. Further, including the pressure release in the form of the integral vent 52 means that internal pressure release components may not be used, which may result in a smaller, more compact cell, or leave more space available to increase the amount of energetic material within the cell 40. It should be noted that the vent 52 may have a different geometry and is not limited to the placement on the lid piece 44 shown in FIG. 3. For example, the vent 52 may be circular, rectangular, or any other suitable shape.

As shown in FIG. 3, the lid piece 44 may include additional components. In the depicted embodiment, a terminal hole 54 is located at an end of the lid piece 44. The terminal hole 54 houses a negative terminal assembly 56. Additionally, the lid piece 44 may include a rivet hole 60 to hold a rivet 62. Once the cell 40 has been assembled (all internal components enclosed within the container 42 and lid piece 44), the rivet 62 may be coupled to the rivet hole 60 to seal the cell 40. The rivet 62, once placed in the rivet hole 60, may be fixed tightly enough that in case of pressure build-up the vent 52 would disengage prior to the rivet 62. Although a rivet hole 60 and rivet 62 assembly is described according to this embodiment, other embodiments may replace the rivet 62 with a ball bearing, a welded plug, a crimped tube, or any other suitable sealing method.

Figure 4:
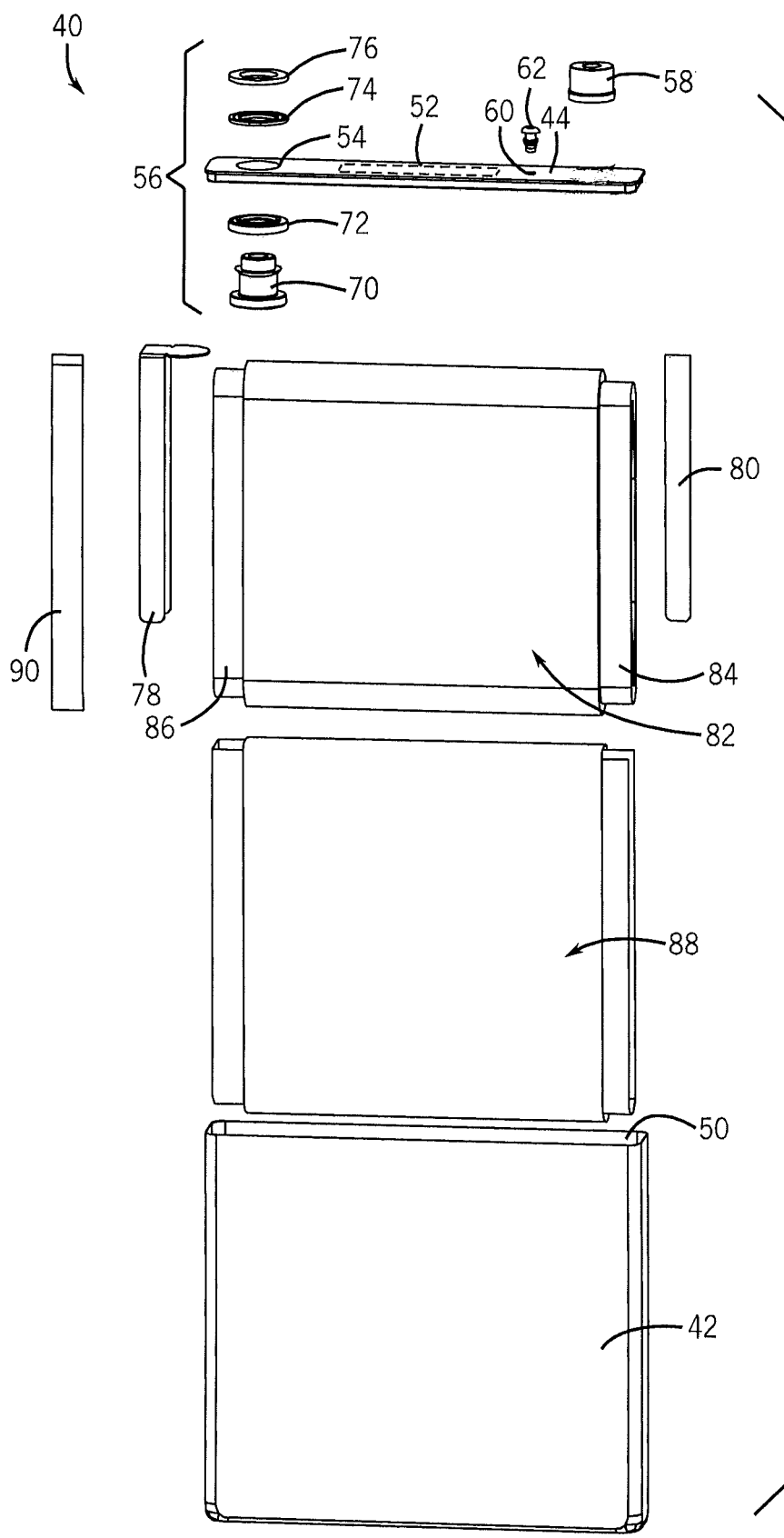
FIG. 4 is an exploded view of the embodiment of the prismatic cell of FIG. 3, having an electrode assembly.

To provide a better understanding of the internal arrangement of the cell 40, FIG. 4 provides an exploded view of an embodiment of the cell 40 demonstrating the internal components. As the lid piece 44 is positively polarized, the negative terminal assembly 56 must be isolated from the body of the cell 40 to prevent a short circuit. An exploded view of the negative terminal assembly 56 is included in detail to demonstrate the manner in which it may be electrically insulated from the positively polarized lid piece 44. The negative terminal assembly 56 has a tab 70 as the base, with a bottom gasket 72 placed around the tab 70. The tab 70 with the bottom gasket 72 is placed through the negative terminal hole 54 such that the top surface of the bottom gasket 72 is in contact with the bottom surface of the lid piece 44. A top gasket 74 is placed around the tab 70 such that the bottom surface of the top gasket 74 is in contact with the top surface of the lid piece 44. A metal washer 76 is layered on top of the top gasket 74. The gaskets 72 and 74 may be formed of a polymer material to provide electrical insulation and sealing around the negative terminal hole 54. The arrangement of the gaskets 72 and 74 isolates the negative terminal assembly 56 from the lid piece 44. The tab 70 and metal washer 76 are used to transfer charge from the negative terminal assembly 56, for example, to the positive terminal 58 via a cord, wire, cable, etc.

To provide charge to the negative and positive terminals 56 and 58, current collectors 78 and 80 couple the terminals 56 and 58 to an electrode assembly 82. The negative terminal assembly 56 is coupled to a negative current collector 78, and the positive terminal 58 is coupled to a positive current collector 80. The current collectors 78 and 80 may be designed to reduce the volume occupied by the current collectors 78 and 80 within the cell 40. The reduced design may enable more internal volume to be dedicated to an electrode assembly 82, thereby increasing the total energy density of the cell 40. For example, the current collectors 78 and 80 may be ultrasonically welded to the electrode assembly 82 to save space. Ultrasonic welding may be desired as no additional filler material/apparatus is required, thereby minimizing occupied volume within the cell 40.

The electrode assembly 82 provides the energy within the cell 40. To maximize the energy density of the cell 40, the electrode assembly 82 should account for as much of the internal volume of the cell 40 as possible. To sufficiently utilize the large portion of internal volume of the cell 40 occupied by the electrode assembly 82, the electrode assembly 82 may be a jelly-roll (e.g., wound) or a stacked configuration. Both jelly-roll and stacked electrode configurations enable large electrode surface area while minimizing internal resistance within the cell 40. Enabling further design optimization, both jelly-roll and stacked electrode configurations can be oriented vertically (e.g., coils 84 and 86 extending to the top and bottom) or horizontally (e.g., coils 84 and 86 extending to the right and left) within the cell 40.

The electrode assembly 82 includes a positive coil 84 extending from one end and a negative coil 86 extending from the opposite end. The positive coil 84 may be constructed of aluminum, while the negative coil 86 may be constructed of copper. The positive coil 84 provides a positive charge to the positive terminal 58 via the positive current collector 80. Similarly, the negative coil 86 provides a negative charge to the tab 70 of the negative terminal assembly 56 via the negative current collector 78. Thus, the coils 84 and 86 of the electrode assembly 82 generate an electric potential across the terminals 56 and 58.

The positive coil 84 provides charge to the container 42 to positively polarize the container 42 and the lid piece 44, thereby enabling the positive terminal 58 to be placed anywhere on the outside of the cell 40. To achieve this, the positive coil 84 of the electrode assembly 82 may be ultrasonically welded to the positive current collector 80, which is then placed in direct contact with the container 42 and/or the lid piece 44. As the entire cell 40 is positively charged, the positive terminal may be located anywhere on the cell 40, enabling improved battery module 22 configurations. Further, improved thermal management of the cell 40 may be possible utilizing the positive polarity of the cell 40. For example, heat generated within the cell 40 may be conducted away from the electrode assembly 82 to the container 42 via the positive current collector 80. The excess heat may be subsequently removed from the container 42 by an external heat management system.

To ensure the operability of the cell 40 and prevent the occurrence of a short circuit, the negative charge generated by the negative coil 86 of the electrode assembly 82 is electrically isolated from the container 42. An insulation film 88 may be placed around the body of the electrode assembly 82 to prevent contact between the electrode assembly 82 and the container 42. Further, an insulation cap 90 may be placed over the body of the negative current collector 78 to prevent any negative charge contacting the positively polarized container 42. The insulation film 88 and cap 90 may be composed of any suitable electrically insulating material, such as, glass, paper, polymers, plastics, and/or a combination thereof. The insulation film 88 and cap 90 may be constructed to have minimal thickness, such that the electrode assembly 82 may maximize the amount of space it occupies within the cell 40.

Figure 5:
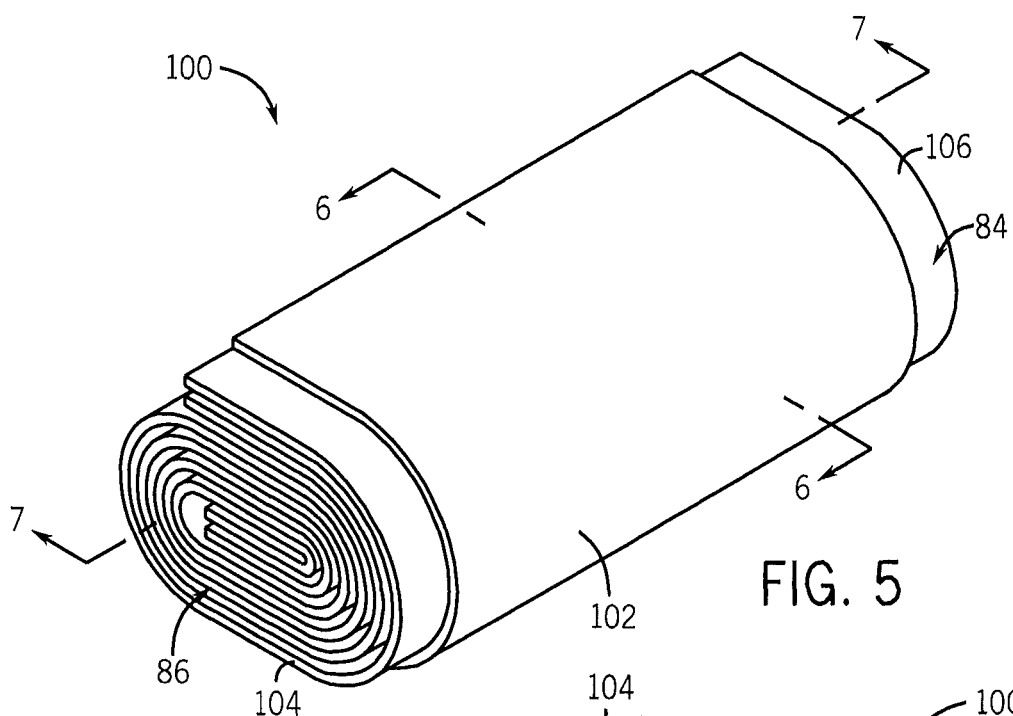
FIG. 5 is a perspective view of an embodiment of an electrode having a jelly-roll structure, which may be contained within a prismatic cell with a positive polarity rigid container.

As the electrode assembly 82 is the only component of the cell 40 that contains energy, the geometry of the electrode assembly 82 may be optimized to utilize the internal volume of the cell 40 more effectively. FIG. 5 illustrates an embodiment of the electrode assembly 82 wherein the electrode assembly 82 is a jelly-roll 100. In the depicted embodiment, the electrode assembly 82 is assembled from four layers of long, thin, flat materials simultaneously wound to result in a flattened cylindrically shaped coil, thus gaining the designation "jelly-roll." The perspective view of FIG. 5 demonstrates the jelly-roll 100 with the positive coil 84, the negative coil 86, and an outer layer of an insulation material 102.

Figure 6:
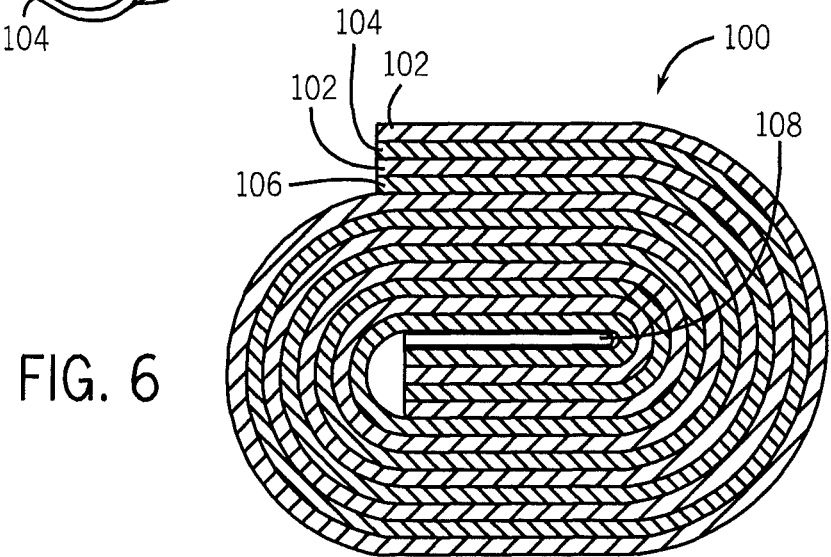
FIG. 6 is a cross-sectional view of the embodiment of the jelly-roll electrode taken along line 6-6 of FIG. 5, demonstrating the wound structure.

To aid in the discussion of the layered structure of the jelly-roll 100, FIG. 6 depicts a cross-section view of the jelly-roll 100. The four long flat layers are arranged in a compacted form via winding and may be wound with or without the use of a core 108. The electrical insulation material 102 accounts for two of the layers. A negative coil material 104 accounts for one layer, and a positive coil material 106 accounts for the final layer. When wound as in FIG. 6, the insulation material 102 is positioned on the outside, followed by the negative coil material 104, another layer of insulation material 102, and a final layer of positive coil material 106. As shown, this results in alternating layers of coil materials 104 and 106 and insulation material 102 when wound. Positioning a layer of insulation material 102 between each layer of negative coil material 104 and positive coil material 106 prevents contact between the coil materials 104 and 106, resultantly preventing short circuits within the jelly-roll 100.

Figure 7:
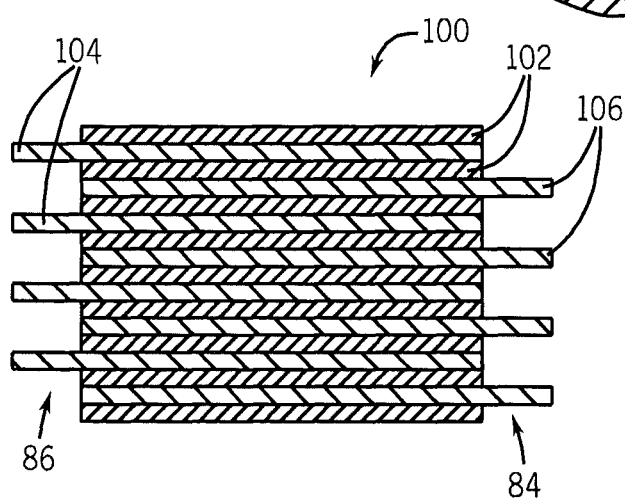
FIG. 7 is a cross-sectional view of the embodiment of the jelly-roll electrode taken along line 7-7 of FIG. 5, showing the end coils.

When viewed from a longitudinal cross-section, as in FIG. 7, the different widths of the layers of the electrode assembly 82 are depicted. The layers of electrical insulation material 102 may be centered with respect to the jelly-roll 100. The layers of the negative coil material 104 may extend beyond the insulation material 102 to the left to form the negative coil 86, while the layers of the positive coil material 106 may extend beyond the insulation material 102 to the right to form the positive coil 84. However, in alternative embodiments, the coil materials 104 and 106 may extend different lengths and/or directions to form the coils 84 and 86. Further, the actual number of layers or windings applied to the jelly-roll 100 may vary to create different coil configurations in an actual implementation.

Figure 8:
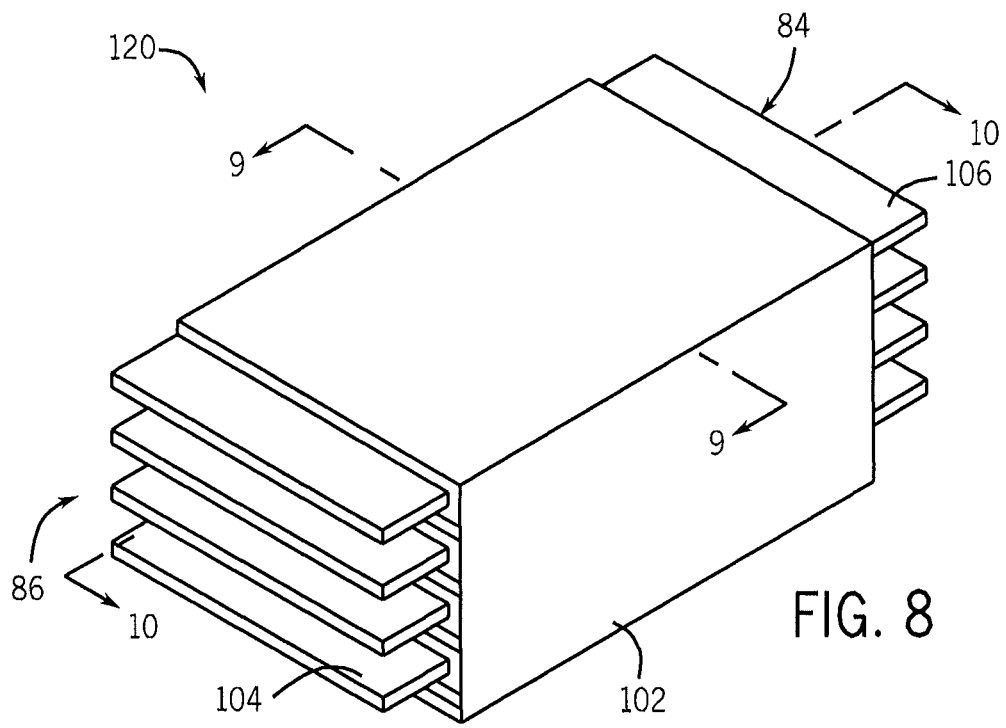
FIG. 8 is a perspective view of an embodiment of an electrode having a stacked structure, which may be contained within a prismatic cell with a positive polarity rigid container.
Figure 9:
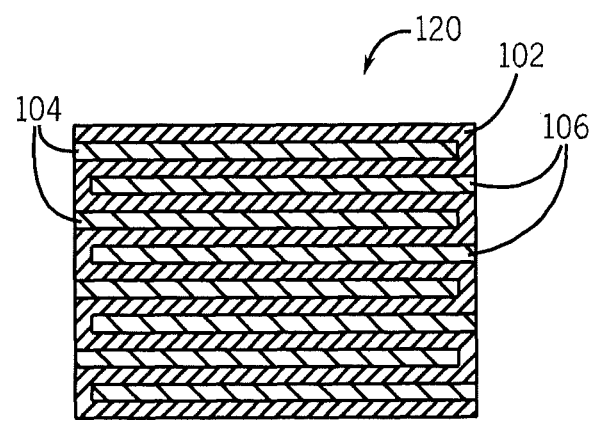
FIG. 9 is a cross-sectional view of the embodiment of the stacked electrode taken along line 9-9 of FIG. 8, demonstrating the discrete plate structure.

As an alternative to the jelly-roll 100, the electrode assembly 82 may be in the form of a stack 120, as shown in FIG. 8. Within the stack 120, the positive coil 84 may be formed of discrete plates formed of the positive coil material 106. Similarly, the negative coil 86 may be formed of discrete plates formed of the negative coil material 104. The electrical insulation material 102 may be a continuous strip that alternatingly weaves between the plates of negative and positive coil materials 104 and 106 to prevent a short circuit, as shown in FIG. 9 (taken along line 9-9 of FIG. 8). Appropriate insulation materials 102 may include paper, glass, plastic, or a combination thereof.

Figure 10:
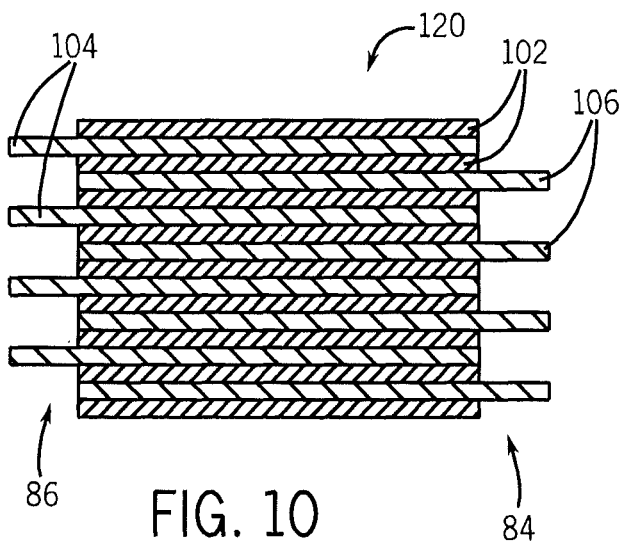
FIG. 10 is a cross-sectional view of the embodiment of the stacked electrode taken along line 10-10 of FIG. 8, showing the end coils.

The cross-section of the electrode stack 120 shown FIG. 10, taken along line 10-10 of FIG. 8, depicts the different widths of the coil materials 104 and 106 which form the electrode coils 84 and 86. The arrangement of FIG. 10 is similar to that of FIG. 7, demonstrating alternating coil materials 104 and 106 separated by the electrical insulation material 102 to prevent short circuits between the coil materials 104 and 106. To form the negative coil 86, the plates of the negative coil material 104 may extend to the left, beyond the edge of the insulation material 102. To form the positive coil 84, the plates of the positive coil material 106 may extend to the right, beyond the edge of the insulation material 102. A varying number of layers may be applied to the stacked electrode 120 in an actual implementation.

Although either electrode 82 configuration, jelly-roll 100 or stack 120, may be functional within the cell 40, one configuration may be selected depending on the specific goals of the implementation. For example, the jelly-roll 100 may be desirable when maximizing the energy density of the cell 40 is the primary goal. Alternatively, the stack 120 may be desirable when minimizing the cost of the cell 40 is the primary goal. Both configurations may generally enable efficient energy packing in the cell 40, which may provide an extended travel range for xEVs.

Figure 11:
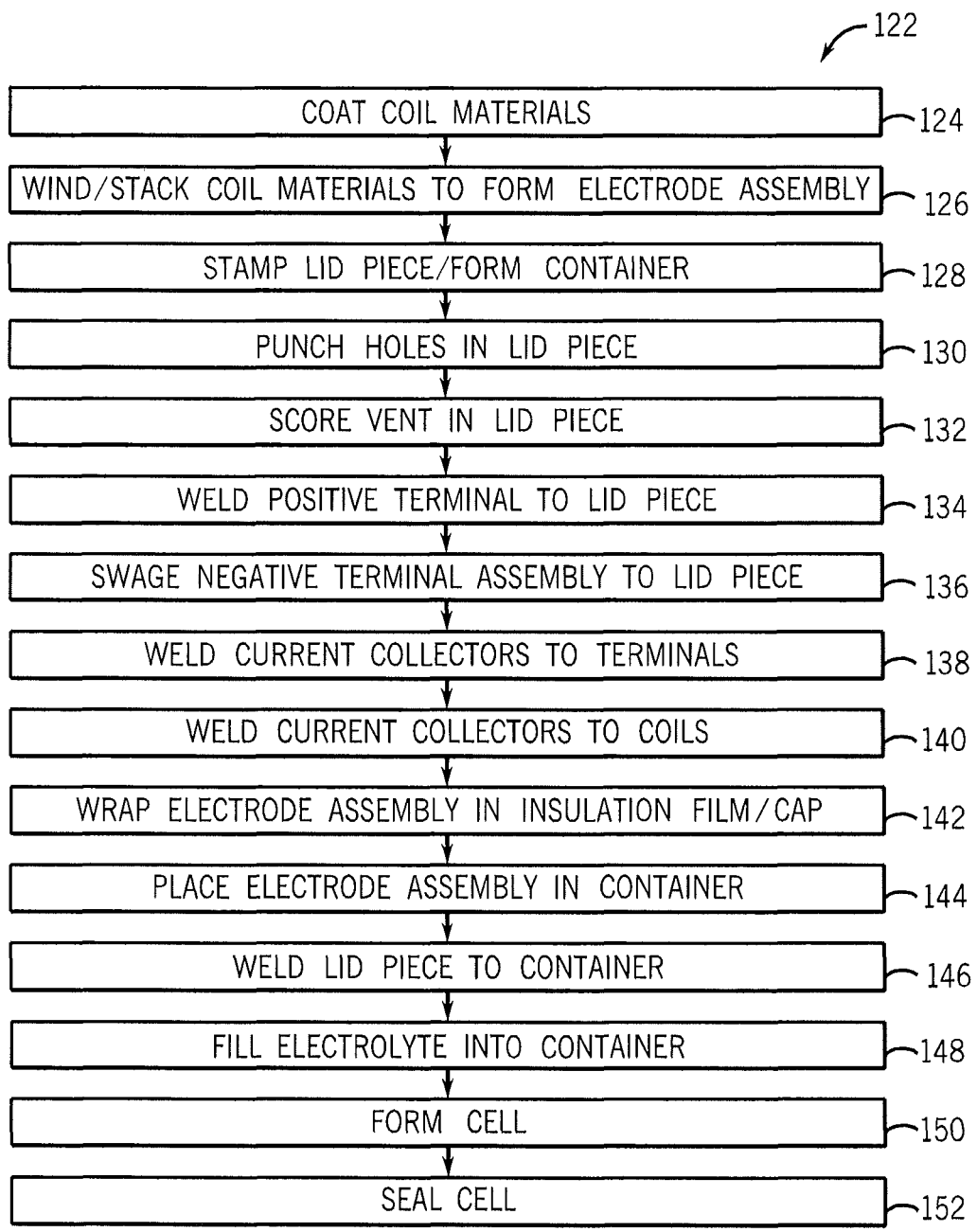
FIG. 11 is a block flow diagram describing the manufacturing and assembly process of a prismatic cell with a positive polarity rigid container.

The method of assembly and manufacture of the cell 40 may provide an additional approach to improve the energy density and decrease the cost associated with battery modules 22 for xEVs. FIG. 11 illustrates a general method 122 for the construction of a prismatic lithium-ion cell 40 with a rigid positive polarity container 42. The insulation material 102 and coil materials 104 and 106 may be selected based on desired battery chemistry. For example, the insulation material may be paper, the negative coil material 104 may be copper, and the positive coil material 106 may be aluminum. Selection of thin materials may enable more layers to be formed within the electrode assembly 82, increasing the energy density of the cell 40. Further, the coil materials 104 and 106 may be coated, leaving only the ends exposed to form the positive coil 84 and the negative coil 86 (block 124). Depending on the chosen geometry, jelly-roll 100 or stack 120, the electrode assembly 82 may be formed (block 126). The electrode assembly 82 may be prepared before, after, or during the preparation of the rest of the cell 40.

The construction of the cell 40 includes the manufacture of the container 42 and lid piece 44. The lid piece 44 may be stamped from a sheet of steel or aluminum. The container 42 may be formed by extrusion, welded fabrication, brazed fabrication, casting, another method, or a combination thereof from steel or aluminum (block 128). The lid piece 44 may contain two holes: the negative terminal hole 54 and the rivet hole 60, which may formed by a punching process (block 130). Both holes may be punched simultaneously, or each hole may be punched independently. Additionally, the vent 52 may be scored, formed, cut, coined, or otherwise machined into the lid piece 44 (block 132). To save time and cost associated with manufacturing, the steps contained in blocks 128, 130, and 132 (with respect to lid piece 44) may be performed simultaneously. The assembly process for the internal components of the cell 40 may also be simplified to reduce the cost and time expended.

To maximize the energy density, the volume allotted to connector material/apparatus for assembling internal components of the cell 40 may be minimized, particularly with respect to minimizing and/or eliminating the use of welding. The positive terminal 58 may be welded to the container 42 or the lid piece 44, depending on the desired battery module 22 arrangement (block 134). The welding process used may be modified to limit the amount of filler material required. The polymeric properties of the gaskets 72 and 74 may be utilized to form a swaged connection and seal between the lid piece 44 and the negative terminal assembly 56 (block 136), thereby removing the need to weld the negative terminal assembly 56 to the lid piece 44. The swage connection may be an advantageous method of assembly since it does not use any additional components/material, thereby preserving volume within in the cell 40 for the electrode assembly 82. Also in an effort to preserve cell 40 internal volume, the current collectors 78 and 80 may have a reduced design. To further this effort, the current collectors 78 and 80 may be ultrasonically welded to the terminals 56 and 58, respectively (block 138). Ultrasonic welding may be beneficial since the process does not use a filler material to couple components. Rather, the components are coupled using high-frequency acoustic vibrations to create a solid-state weld. Ultrasonic welding may also be utilized to couple the current collectors 78 and 80 to the coils 86 and 84, respectively (block 140). Alternatively, another advanced welding process, such as laser welding, may be used.

Once the internal components are assembled, they may be placed within the cell 40 to complete the method of assembly 122. The electrode assembly 82 may be wrapped in a thin insulation film 88 to prevent electrical contact between the electrode assembly 82 and the container 42. As the container 42 is positively polarized, further separation may be desirable between the negative coil 86 and the container 42. Therefore, the additional insulation cap 90 may be installed over the negative coil 86 (block 142). Use of thin insulation materials, such as, plastic, rubber, or paper, may enable increased energy density of the cell 40 by reducing the internal volume consumed by insulation. After the insulation film 88 and cap 90 are in place, the entire resultant assembly (e.g., insulated electrode assembly 82, current collectors 78 and 80, and terminals 56 and 58 coupled to the lid piece 44) may be placed into the container 42 via opening 50 (block 144). The lid piece 44 may then be coupled (e.g., crimped, welded, etc.) to the container opening 50 (block 146). The cell may be filled with an electrolyte material (e.g., liquid or gel) via the rivet hole 60 (block 148). The cell 40 may be formed (block 150), and finally, the cell 40 may be sealed (e.g., by fixing the rivet 62 in the rivet hole 60) (block 152). The fully assembled cell 40 may then be ready for use, for example, in a battery module 22 for use in an xEV, a portable battery module, or another energy storage application. Method 122 may include some additional steps during an actual implementation. Further, the steps of the method 122 may be performed sequentially as outlined, or the steps may be re-ordered, as per design requirements.

Figure 12:
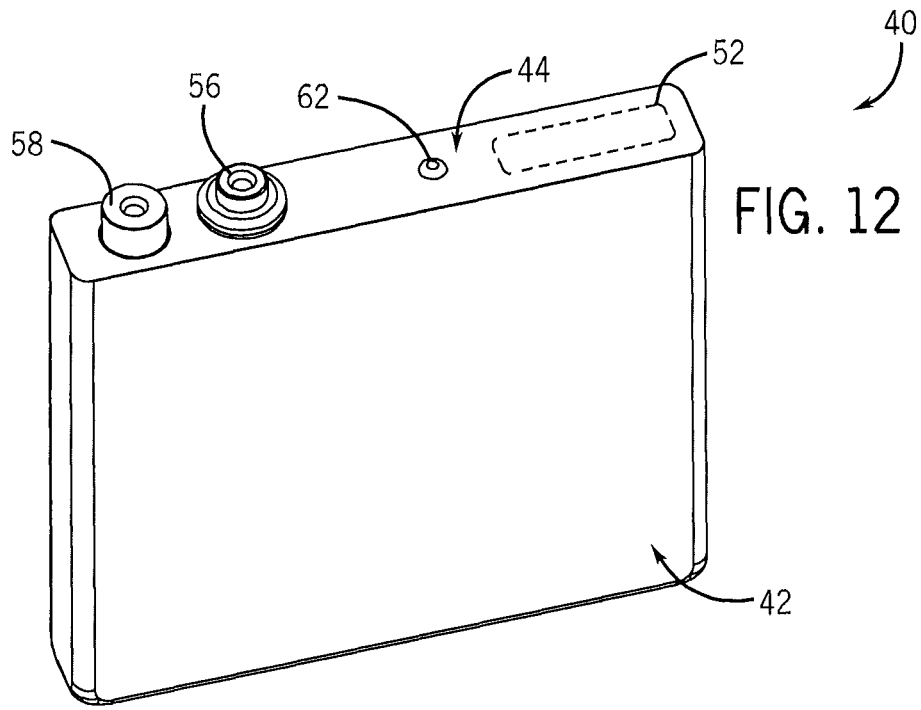
FIG. 12 is a perspective view of an alternative embodiment of a prismatic cell with a positive polarity rigid container, having the positive terminal proximate the negative terminal assembly.
Figure 12A:
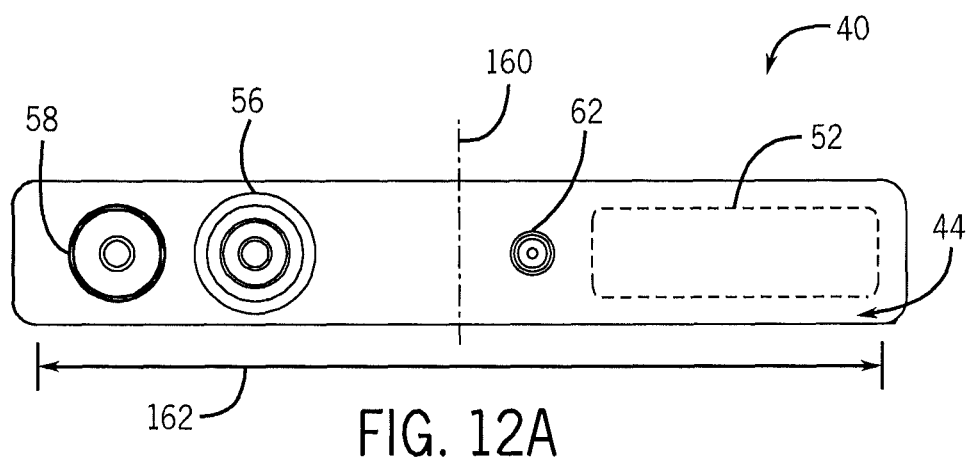
FIG. 12A is a top view of the cell of FIG. 12, showing an embodiment of the placement of the positive terminal and the negative terminal assembly.
Figure 12B:
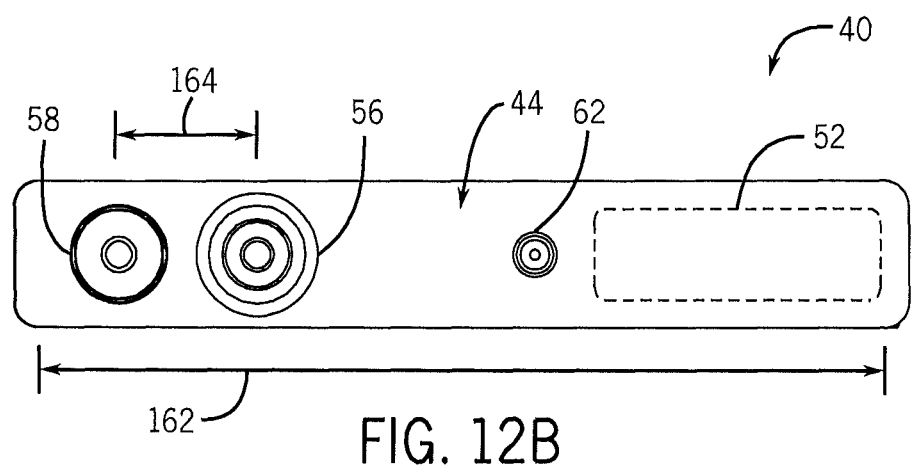
FIG. 12B is a top view of the cell of FIG. 12, showing an alternative embodiment of the placement of the positive terminal and negative terminal assembly.

The prismatic cell 40 with the rigid positively polarized container 42, as manufactured and assembled with respect to method 122, may be well-suited for integration into a battery module 22. Particularly, the cell 40 as depicted in FIG. 12 may be well-suited for configuration into a battery module 22 for an xEV. A primary feature of the positively polarized cell 40 is that the positive terminal 58 may be located anywhere on the cell 40. Accordingly, in FIG. 12, an embodiment of the cell 40 is shown wherein the positive terminal 58 has been relocated (with respect to FIG. 3) to be relatively near the negative terminal assembly 56. For example, FIG. 12A provides a top view of the cell 40 in which a line 160 bisects a length 162 of the lid piece 44. In the depicted embodiment, the positive terminal 58 may be considered to be near the negative terminal assembly 56 when both terminals 56 and 58 are located on the same side of the bisecting line 160. Alternatively, as presented in FIG. 12B, the positive terminal 58 and the negative terminal assembly 56 may be separated by a distance 164. In this embodiment, the positive terminal 58 may be considered to be near the negative terminal assembly 56 when the distance 164 is a small percentage of the length 162. For example, the distance 164 may be between approximately 5% and 40% of the length 162 of the cell 40. Placement of the positive terminal 58 near the negative terminal assembly 56 may provide several advantages when used as part of the battery module 22.

Figure 13:
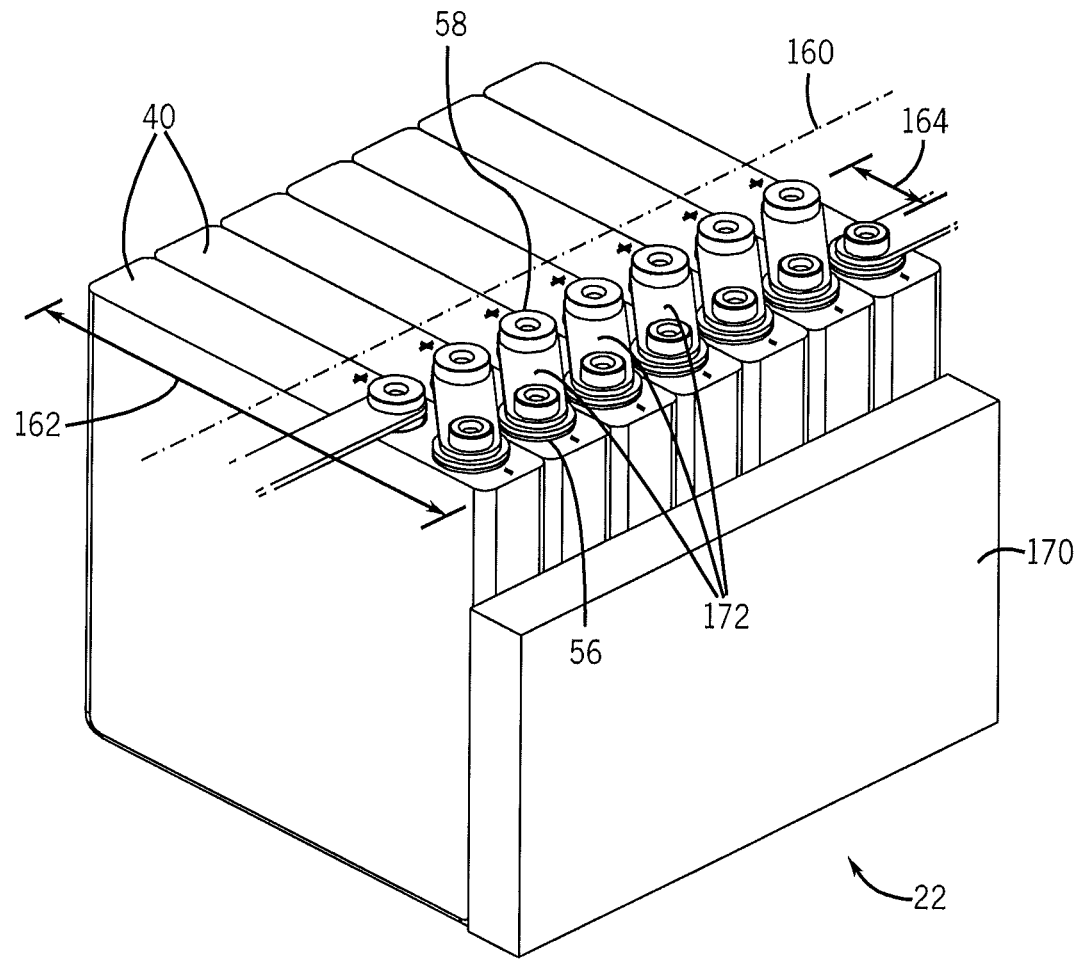
FIG. 13 is a perspective view of an embodiment of a battery module containing multiple prismatic cells of FIG. 12.

Further, the rectangular prismatic shape of the cell 40 may enable improved battery module 22 arrangements. For example, as opposed to a module of cylindrical cells, less volume is required to house a module of the prismatic cells 40 due to less airspace between the cells 40. This may be useful in xEV applications, as well as other energy storage applications, where free space is limited. FIG. 13 depicts an embodiment of the battery module 22 incorporating seven cells 40 with the positive terminals 58 located proximate to the negative terminal assemblies 56. In this embodiment, the cells 40 are each coupled to a single plate 170. However, the cells 40 may be coupled in a variety of ways, such as, shrink wrap, adhesive, bolts, etc. Having the positive terminals 58 near the negative terminal assemblies 56 may enable the cells 40 within the battery module 22 to be arranged in the same orientation, as opposed to the alternating orientation used in typical battery modules.

As shown in FIG. 13, the cells 40, having the terminals 56 and 58 close to one another and arranged in the same orientation, may enable the use of shorter inter-cellular connectors 172. For example, when the terminals 56 and 58 are arranged on the same side of the bisecting line 160, the connectors 172 may be approximately half the length of connectors 172 used when the terminals 56 and 58 are on opposite ends of the cell 40. Further, when the terminals 56 and 58 have the small separation distance 164 (e.g., between 5 and 40% of the length 162), the connectors 172 may be less than half the length of connectors 172 used when the terminals 56 and 58 are on opposite ends of the cell 40. The connectors 172 may be bus bars, wires, cables, or any suitable conducting material. Shortened connectors 172 may result in reduced cost of construction and operation of the battery module 22. For example, shorter connectors 172 may require less overall material for construction and less wasted material from manufacturing the connectors 172, particularly when formed by stamping. Further, shortened intercellular connectors 172 may reduce the voltage drop induced by the intercellular connectors 172. Reducing the voltage drop may reduce power losses within the cell 40, thereby reducing the cost of voltage sense. In the depicted embodiment, seven cells 40 are shown connected in series in the battery module 22, but any desired number of cells 40 and arrangement may be used.

Figure 14:
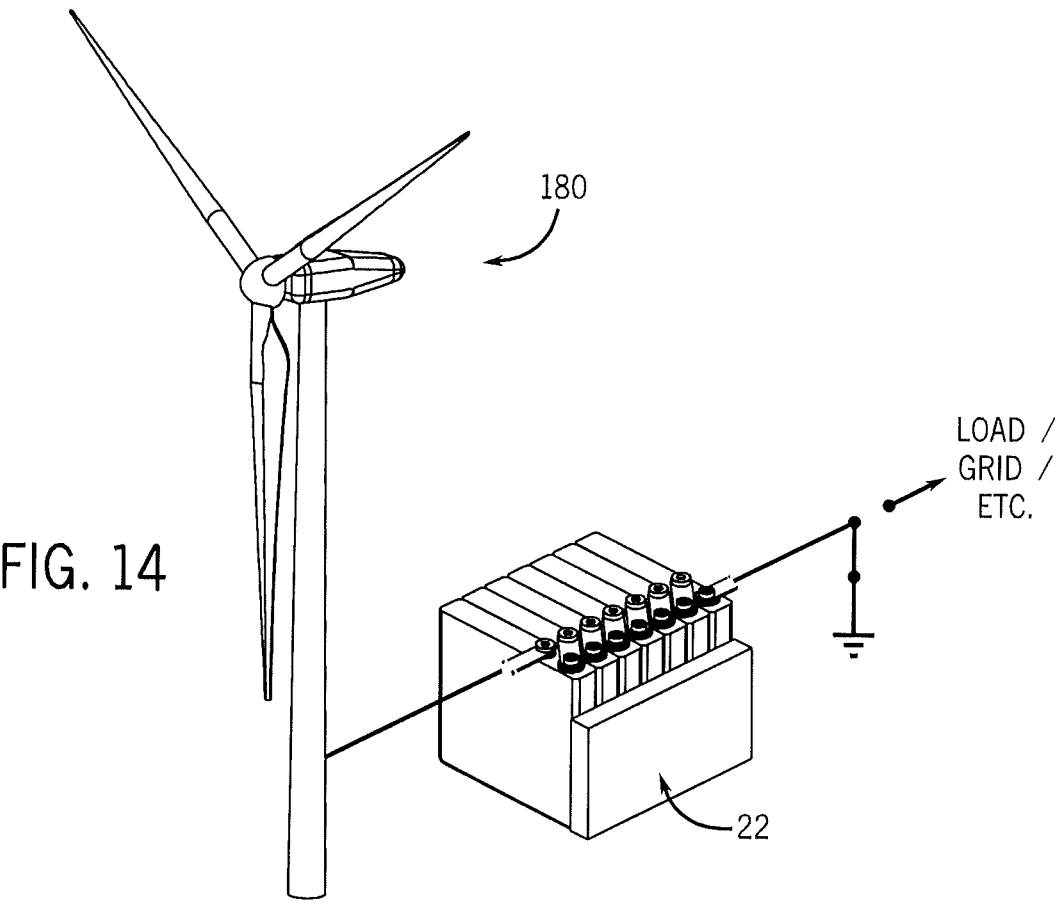
FIG. 14 is a plan view of an embodiment of a wind turbine using the pack configuration of FIG. 13 for energy storage.
Figure 15:
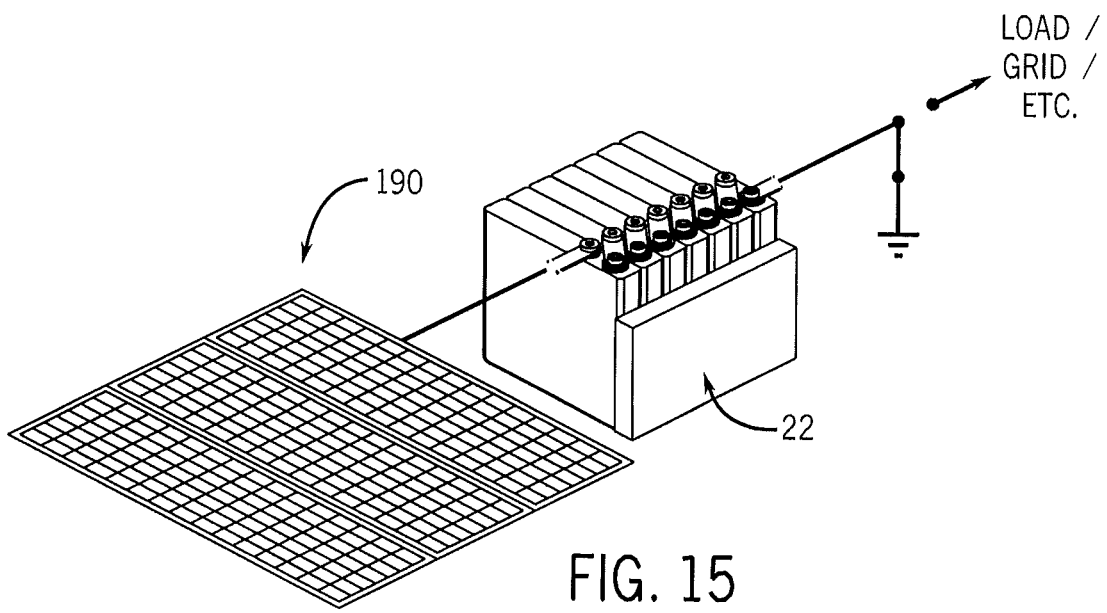
FIG. 15 is a plan view of an embodiment of a solar panel using the pack configuration of FIG. 13 for energy storage.

Battery modules 22 composed of multiple prismatic cells 40 with rigid positive polarity containers 42 may be aptly suited for use in xEVs. Some particular advantages for xEV applications include improved energy density, increased rigidity and durability, improved module configuration, and decreased cost of production. However, these properties of the battery modules 22, composed of multiple prismatic cells 40, may also be useful beyond the application of xEVs. For example, the battery module 22 described with respect to FIG. 13 may be suitable for energy storage applications. As depicted in FIGS. 14 and 15, the battery module 22 may act as energy storage for an alternative energy source, such as, a wind turbine 180 or a solar panel 190.

Referring to FIG. 14, the battery module 22 may store energy generated as wind interacts with the turbine 180 blades. As the wind turbine 180 blades begin to spin due to force from the wind, a shaft within the wind turbine 180 rotates, as well. The rotating shaft may cause magnets to interact with a conductive coil (e.g., a generator) and the resulting voltage may drive electrical current. This electrical current may be used to charge the battery module 22. Similarly, the solar panel 190 in FIG. 15 may be used to charge the battery module 22. The energy stored in the battery modules 22 may then be used for simple household functions, industrial applications, or other various uses. Alternatively, the stored energy may be sent to an electric grid for dispersion to other users. Further applications of the battery modules 22 having the rigid positive polarity cells 40 may include additional battery modules, stationary power devices, portable battery modules, battery modules for HVAC systems, and use as an uninterruptable power supply, among other things.

References herein to the positions of elements (e.g., "top," "bottom," "above," "below," etc.) are merely used to describe the orientation of various elements in the figures. It should be noted that the orientation of various elements may differ according to other embodiments, and that such variations are intended to be encompassed by the present disclosure.

It is important to note that the construction and arrangement of elements of the lithium-ion cell as shown in the various embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions, and arrangement of the various embodiments without departing from the scope of the present disclosure.

What is claimed is:

1. A method of manufacturing a battery cell, the method including:
    forming an electrode assembly having an electrode assembly body, a negative coil, and a positive coil, the electrode assembly forming a jelly-roll structure, the jelly-roll structure including a plurality of layers, the plurality of layers including a first insulation layer, a second insulation layer, a negative coil layer, and a positive coil layer, the first insulation layer having a first insulation layer edge and a second insulation layer edge opposite the first insulation layer edge, the second insulation layer having a third insulation layer edge and a fourth insulation layer edge opposite the third insulation layer edge;
    placing the negative coil layer between and in direct physical contact with each one of the first and second insulation layers, the negative coil layer having a first negative coil layer edge and a second negative coil layer edge opposite the first negative coil layer edge;
    aligning the second negative coil layer edge with the second insulation layer edge of the first insulation layer and with the fourth insulation layer edge of the second insulation layer;
    disposing the positive coil layer under and in direct physical contact with the second insulation layer, the positive coil layer having a first positive coil layer edge and a second positive coil layer edge opposite the first positive coil layer edge;
    aligning the first positive coil layer edge with the first insulation layer edge of the first insulation layer and with the third insulation layer edge of the second insulation layer, the first and second insulation layers being centered with respect to the jelly-roll structure, the negative coil layer extending in a first direction beyond the first and second insulation layers, the positive coil layer extending in a second direction opposite the first direction beyond the first and second insulation layers;
    rolling the plurality of layers to form the jelly-roll structure;

placing the electrode assembly in a container; and
coupling a lid to the container.

2. The method of claim 1, wherein the method further includes:
    stamping the lid; and
    forming at least one opening on the lid, the at least one opening including at least one of a positive terminal opening and a negative terminal opening.

3. The method of claim 1, wherein the method further includes:
    forming at least one of a vent and a rivet on the lid.

4. The method of claim 3, wherein the vent is an integral vent and has at least a first portion engaged with the lid and a second portion engaged with the first portion, the vent being arranged to act as a pressure release valve at least by partially disengaging from the lid at least by keeping the first portion engaged with the lid, prior to the rivet detaching, to release pressure when a pressure in the container exceeds a threshold.

5. The method of claim 1, wherein the method further includes:
    coupling a positive terminal to the lid.

6. The method of claim 1, wherein the method further includes:
    forming a swaged connection and seal between the lid and a negative terminal assembly.

7. The method of claim 6, wherein the negative terminal assembly includes at least one of:
    a negative terminal comprising a top protrusion and a bottom protrusion, the top protrusion of the negative terminal being an annular protrusion;
    a top gasket disposed between the top protrusion of the negative terminal and a top surface of the lid; and
    a bottom gasket disposed between the bottom protrusion of the negative terminal and a bottom surface of the lid, the top and bottom gaskets swaging the negative terminal to the lid and electrically insulating the negative terminal from the lid, the top gasket and the bottom gasket being separate pieces.

8. The method of claim 7, wherein the method further includes:
    coupling a positive current collector to the container;
    coupling the positive coil of the electrode assembly to the container, the container and the lid being positively polarized; and
    coupling a negative current collector to the negative terminal assembly, the negative current collector physically contacting the negative coil.

9. The method of claim 8, wherein the negative current collector has a negative current collector body, and the method further includes:
    placing an insulation cap over the negative current collector body.

10. The method of claim 1, wherein the method further includes:
    wrapping an insulation film placed around the electrode assembly body.

11. A method of manufacturing a battery cell, the method including:
    forming an electrode assembly having an electrode assembly body, a negative coil, and a positive coil, the electrode assembly forming a jelly-roll structure, the jelly-roll structure including a plurality of layers, the plurality of layers including a first insulation layer, a second insulation layer, a negative coil layer, and a positive coil layer, the first insulation layer having a first insulation layer edge and a second insulation layer edge opposite the first insulation layer edge, the second insulation layer having a third insulation layer edge and a fourth insulation layer edge opposite the third insulation layer edge;
    placing the negative coil layer between and in direct physical contact with each one of the first and second insulation layers, the negative coil layer having a first negative coil layer edge and a second negative coil layer edge opposite the first negative coil layer edge;
    aligning the second negative coil layer edge with the second insulation layer edge of the first insulation layer and with the fourth insulation layer edge of the second insulation layer;
    disposing the positive coil layer under and in direct physical contact with the second insulation layer, the positive coil layer having a first positive coil layer edge and a second positive coil layer edge opposite the first positive coil layer edge;
    aligning the first positive coil layer edge with the first insulation layer edge of the first insulation layer and with the third insulation layer edge of the second insulation layer, the first and second insulation layers being centered with respect to the jelly-roll structure, the negative coil layer extending in a first direction beyond the first and second insulation layers, the positive coil layer extending in a second direction opposite the first direction beyond the first and second insulation layers;
    rolling the plurality of layers to form the jelly-roll structure;
    placing the electrode assembly in a container;
    forming a vent and a rivet on a lid, the vent having at least a first portion engaged with the lid and a second portion engaged with the first portion, the vent being arranged to act as a pressure release valve at least by partially disengaging from the lid at least by keeping the first portion engaged with the lid, prior to the rivet detaching, to release pressure when a pressure in the container exceeds a threshold; and
    coupling the lid to the container.

12. The method of claim 11, wherein the method further includes at least one of:
    coupling a positive terminal to the lid; and
    forming a swaged connection and seal between the lid and a negative terminal assembly.

13. The method of claim 12, wherein the negative terminal assembly includes at least one of:
    a negative terminal comprising a top protrusion and a bottom protrusion, the top protrusion of the negative terminal being an annular protrusion;
    a top gasket disposed between the top protrusion of the negative terminal and a top surface of the lid; and
    a bottom gasket disposed between the bottom protrusion of the negative terminal and a bottom surface of the lid, the top and bottom gaskets swaging the negative terminal to the lid and electrically insulating the negative terminal from the lid, the top gasket and the bottom gasket being separate pieces.

14. The method of claim 12, wherein the method further includes:
    coupling a negative current collector to the negative terminal assembly, the negative current collector physically contacting the negative coil.

15. The method of claim 11, wherein the method further includes:
coupling a positive current collector to the container; and
coupling the positive coil of the electrode assembly to the container, the container and the lid being positively polarized.

16. The method of claim 11, wherein the method further includes:
placing an insulation cap over a negative current collector body.

17. The method of claim 11, wherein the method further includes:
wrapping an insulation film placed around the electrode assembly body.

18. A method of manufacturing a battery cell, the method including:
forming an electrode assembly having an electrode assembly body, a negative coil, and a positive coil, the electrode assembly forming a jelly-roll structure, the jelly-roll structure including a plurality of layers, the plurality of layers including a first insulation layer, a second insulation layer, a negative coil layer, and a positive coil layer, the first insulation layer having a first insulation layer edge and a second insulation layer edge opposite the first insulation layer edge, the second insulation layer having a third insulation layer edge and a fourth insulation layer edge opposite the third insulation layer edge;
placing the negative coil layer between and in direct physical contact with each one of the first and second insulation layers, the negative coil layer having a first negative coil layer edge and a second negative coil layer edge opposite the first negative coil layer edge;
aligning the second negative coil layer edge with the second insulation layer edge of the first insulation layer and with the fourth insulation layer edge of the second insulation layer;
disposing a positive coil layer under and in direct physical contact with the second insulation layer, the positive coil layer having a first positive coil layer edge and a second positive coil layer edge opposite the first positive coil layer edge;
aligning the first positive coil layer edge with the first insulation layer edge of the first insulation layer and with the third insulation layer edge of the second insulation layer, the first and second insulation layers being centered with respect to the jelly-roll structure, the negative coil layer extending in a first direction beyond the first and second insulation layers, the positive coil layer extending in a second direction opposite the first direction beyond the first and second insulation layers;
rolling the plurality of layers to form the jelly-roll structure;
placing the electrode assembly in a container;
stamping a lid;
forming a vent and a rivet on the lid, the vent being an integral vent and having at least a first portion engaged with the lid and a second portion engaged with the first portion, the vent being arranged to act as a pressure release valve at least by partially disengaging from the lid at least by keeping the first portion engaged with the lid, prior to the rivet detaching, to release pressure when a pressure in the container exceeds a threshold; and
coupling the lid to the container.

* * * * *